United States Patent
Uchida et al.

(10) Patent No.: US 7,176,978 B2
(45) Date of Patent: Feb. 13, 2007

(54) AV SYNCHRONIZATION SYSTEM

(75) Inventors: Kazuyuki Uchida, Osaka (JP); Kengo Nishimura, Osaka (JP); Akihiro Miyazaki, Osaka (JP); Jyunichi Nakahashi, Nara (JP); Kunihiko Hayashi, Osaka (JP); Satoshi Ikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 393 days.

(21) Appl. No.: 10/847,302

(22) Filed: May 18, 2004

(65) Prior Publication Data

US 2005/0083437 A1  Apr. 21, 2005

(30) Foreign Application Priority Data

Oct. 15, 2003  (JP)  ............................ P2003-355064

(51) Int. Cl.
  *H04N 9/475* (2006.01)
(52) U.S. Cl. ....................................... 348/515; 348/512
(58) Field of Classification Search ................ 348/515, 348/512, 500, 521, 525; 375/240.25, 240.26, 375/240.28; 370/350, 503; *H04N 9/475*
  See application file for complete search history.

(56) References Cited

U.S. PATENT DOCUMENTS 5,664,044 A   9/1997  Ware 6,148,135 A * 11/2000  Suzuki ........................ 348/512
6,356,312 B1 * 3/2002  Lyu ............................. 348/512
6,516,005 B1 * 2/2003  Murayama et al. ......... 348/512

FOREIGN PATENT DOCUMENTS

JP   7-303240   11/1995

* cited by examiner

*Primary Examiner*—Sherrie Hsia
(74) *Attorney, Agent, or Firm*—McDermott Will & Emery LLP

(57) ABSTRACT

In synchronization of a conventional AV system, when a stream as the master stops, a system clock cannot be corrected for synchronization. Since the correction is consistently performed even when an error is small, overhead of correction is large. On the other hand, when an error is large, sharp correction causes a feeling that something wrong. In the present invention, when the stream as the master stops, previously registering the degree of priority regarding the master, consideration of a corrected period or a previous error for the system clock, or transmitting a stream containing information regarding the master can allow for other process to serves as the master. Accordingly, it is possible to provide a method for synchronization with maintaining correction of the system clock. When a corrected error is large, gradual correction or reference can provide a system with normal feeling. Furthermore, when an error of correction is small, omission of correction or reference can provide a system with less overhead.

35 Claims, 19 Drawing Sheets

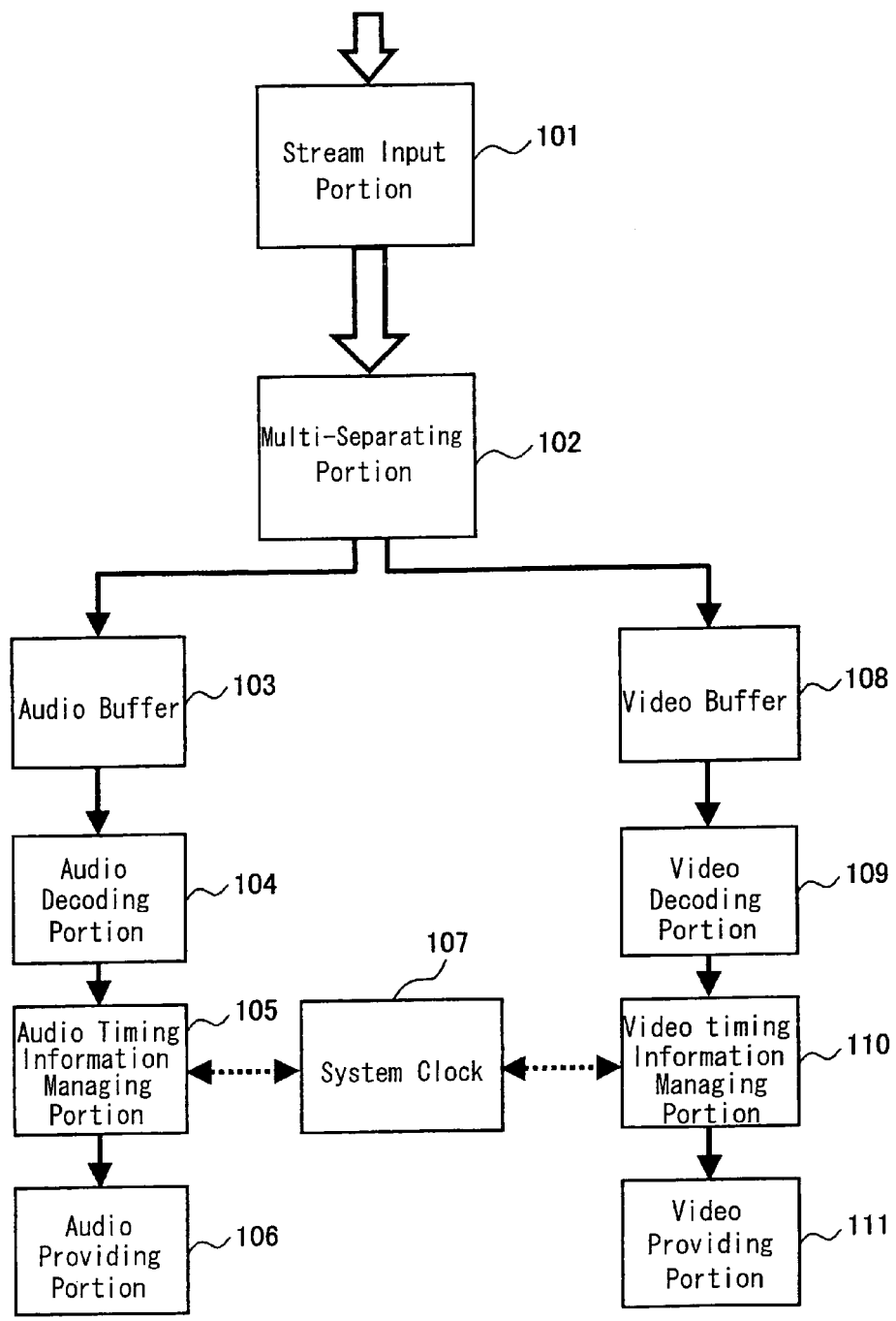
F I G. 1

FIG. 2
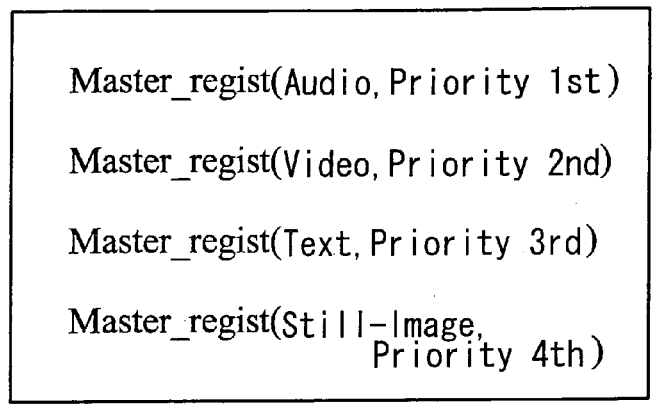
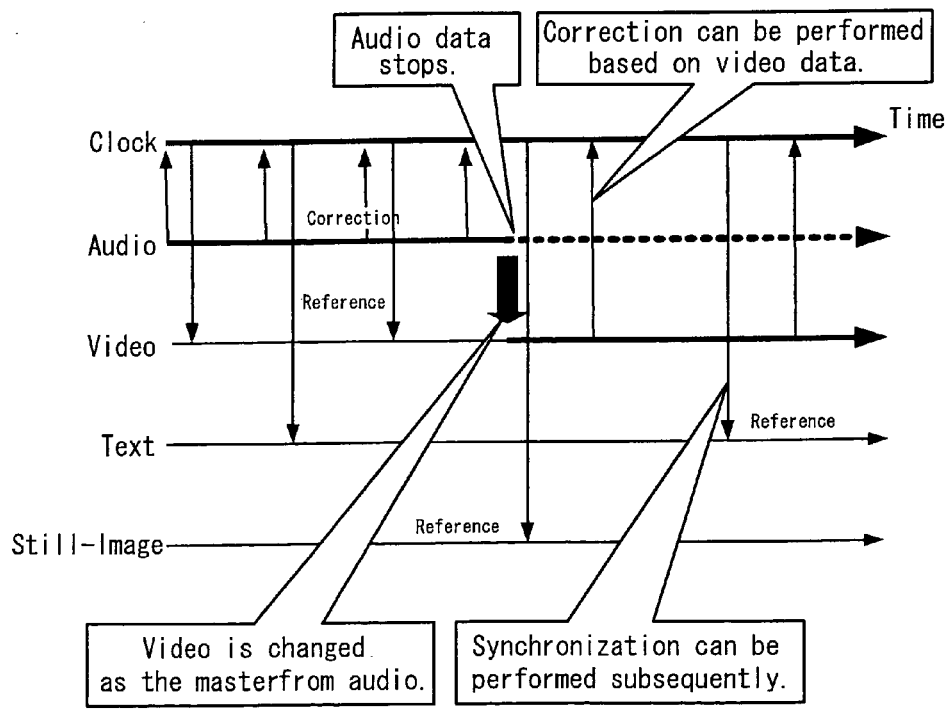

F I G. 6
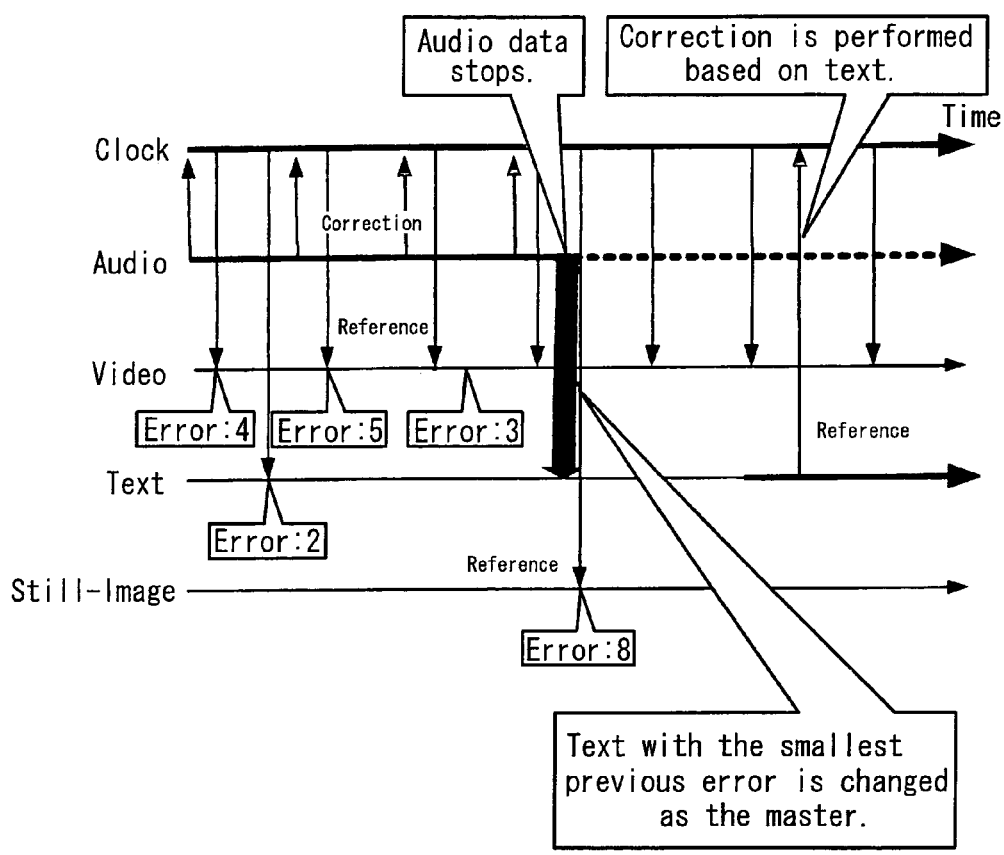

F I G. 7
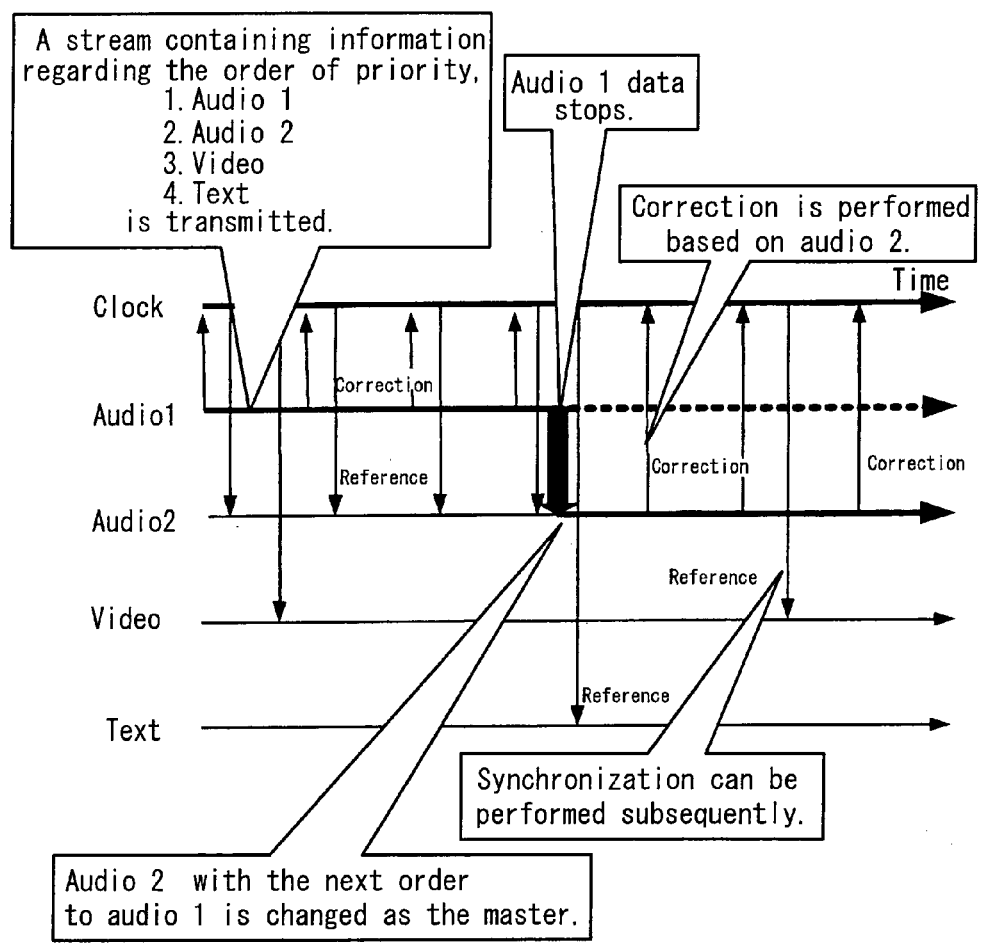

F I G. 1 2
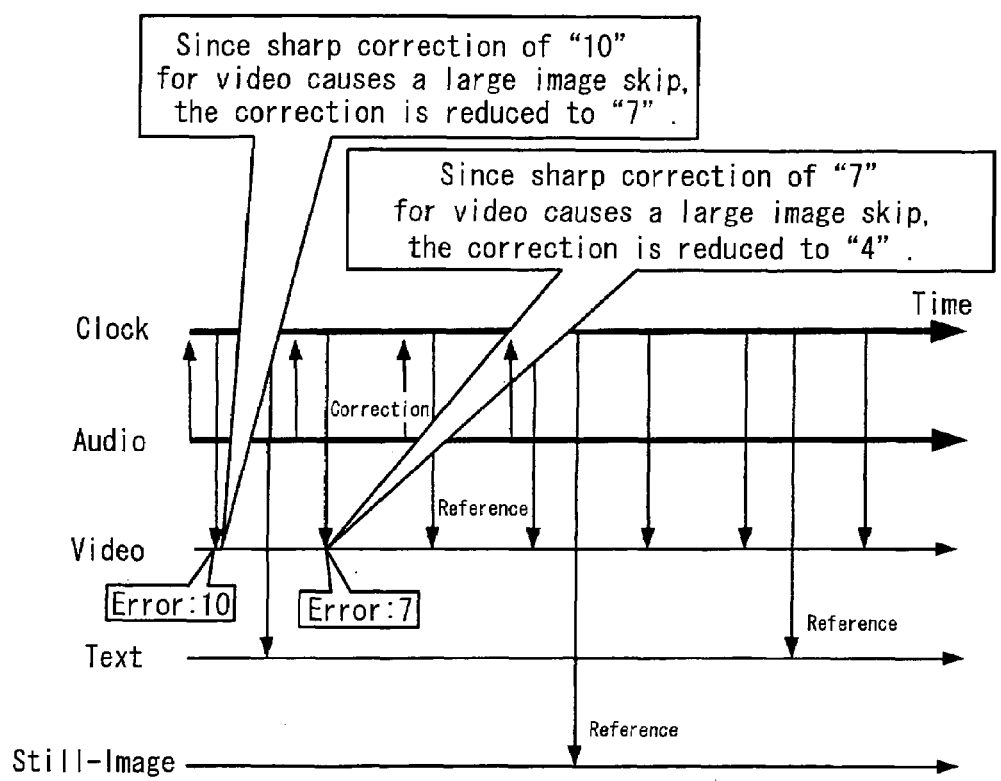

F I G. 1 6
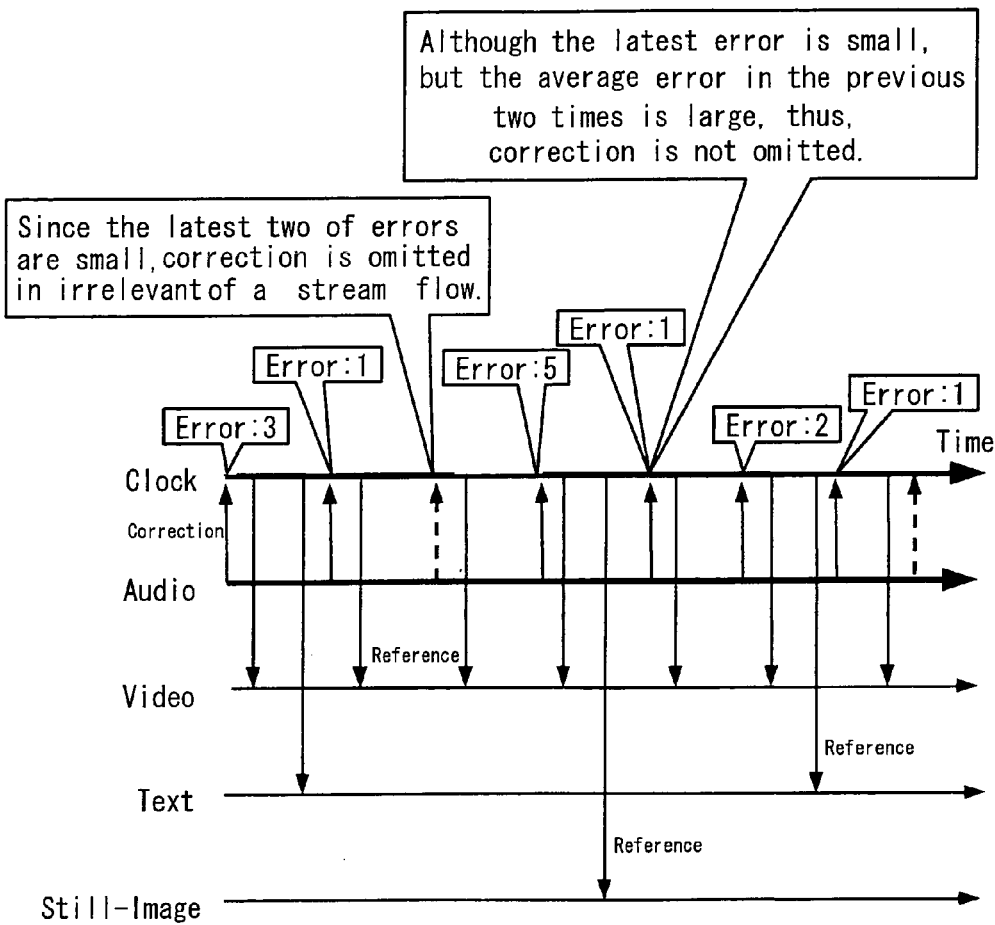

AV SYNCHRONIZATION SYSTEM

FIELD OF THE INVENTION

The present invention relates to an AV synchronization system, which decompresses digital-compressed audio (sound) data, video (image) data, text data, still-image data, or the like, to reproduce them with being synchronized with each other.

BACKGROUND OF THE INVENTION

Recently, according to upgrading of information infrastructure and the progress in multimedia technology, an AV synchronization system, which reads an AV stream through various transmission lines and media, and reproduces it, is desired and becomes commercial.

Some systems uses a stable line such as a digital broadcast, and other systems read a stream through an unstable line, where a transmission rate varies according to the degree of line congestions, such as internet and wireless LAN.

In addition, in a home PC (personal computer), software capable of editing streams becomes commercial, and various stream data can be created personally.

In a method for synchronization in a conventional AV synchronization reproduction apparatus, when processing a plurality kinds of data such as audio data, video data, in parallel, one process corresponding to one kind of the data serves as the master, and its output timing is used as reference timing so that the other kinds of data are provided with synchronized with the reference timing.

Since audio stop causes a feeling that something is wrong, in order to synchronize between audio and video, an audio processing serves as the master, and a system clock is corrected based on timing information of audio taken from the stream, as disclosed in Japanese Laid-Opened Publication KOKAI No. HEI 7-303240, for example. In video reproduction, the system clock is compared with the timing information taken from the video stream. In order to perform synchronization, when the video leads, video reproduction stops to adjust timing, on the other hand, when video delays, video reproduction accelerates.

FIG. 18 is a chart showing a flow of conventional synchronization processing in the case that a stream containing audio, video, text and a still-image is reproduced based on the audio master. In FIG. 18, numerals 201, 202, 203, 204, and 205 represent a clock process, an audio process, a video process, a text process, and a still-image process, respectively. Thick lines represent the clock process, and the audio process 202 as the master.

In the case of the audio master, timing information PTS (Presentation Time Stamps) is taken from a stream to reproduce, and audio is provided based on the timing of a clock 201 subjected to correction 206. The others, the video process 203, the text process 204, and the still picture process 205 are performed based on this clock as reference 207. For example, in the case of the video process 203, its timing information in a stream is taken from the video stream, and the video is provided at the same time with the referenced clock 201 to synchronize. An upward arrow directing toward the clock represents correction of clock. A downward arrow drawn from the clock represents reference of clock.

FIG. 19 is a chart showing operation in a conventional system in the case that the audio data stops in the audio master. After that, since a conventional system remains the audio master, the timing information PTS cannot be taken from the audio. As a result, the clock cannot be corrected, therefore, the video process, the text process, and the still picture process are continued being performed without being synchronized after the stop.

In a conventional method, since the master is consistently fixed, reference time cannot be obtained, when the audio data stops caused by trouble of a transmission line, or when the audio data is exhausted at a midpoint during edition of a stream, in reproduction in the case of the audio master, for example.

In addition, when an error of clock is extremely large, correction causes a large image skip, sound skip, or the like.

Additionally, even when an error of clock is small, since the correction and reference are consistently performed, this causes additional overhead.

SUMMARY OF THE INVENTION

Therefore, it is a primary object of the present invention to provide an AV synchronization system capable of maintaining proper synchronization between a plurality of streams even when the master stream stops or completes. It is another object of the present invention to prevent a large image skip, sound skip, or the like, and to reduce overhead.

To achieve the above object, in one aspect of the invention, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a plurality of time information managing portions for acquiring time information from the decoded stream, correcting the system clock based upon the time information when a master correcting the system clock is registered, and switching one time information managing portion in charge of the stream process of the master into another time information managing portion when a stream process of the master stops.

Accordingly, changing a process of the master can maintain synchronization even when the stream process of the master stops.

In the present invention, the following constructions for changing a process corresponding to the master can be used.

1). The master registered in the time information managing portion includes the degree of priority, and when the stream process in the time information managing portion with the highest degree of priority stops, the time information managing portion is switched into another time information managing portion with the next highest degree of priority. In this case, it is possible to maintain proper synchronization between a plurality of streams with optimizing a stream corresponding to the highest degree of priority.

2). When the stream process of the master in the time information managing portion stops, the time information managing portion is switched into another time information managing portion acquiring the time information from the stream at the earliest time. In this case, it is possible to correct a clock at the earliest time irrelevant of change of the master.

3). When the stream process of the master in the time information managing portion stops, the time information managing portion is switched into another time information managing portion acquiring the time information with the smallest period from the stream. In this case, it is possible to correct a clock at the earliest time irrelevant of change of the master.

4). When the stream process of the master in the time information managing portion stops, the time information managing portion is switched into another time information managing portion with the period corrected for the system clock closest to the time information managing portion. In this case, when the plurality of streams includes two kinds of audio streams, for example, it is possible to change other kinds of audio stream.

5). When the stream process of the master in the time information managing portion stops, the time information managing portion is switched into another time information managing portion with the smallest error to a previous system clock. In this case, a stream process with a small error serves as the master to maintain synchronization.

6). The multiplexed stream includes information of the degree of priority regarding a candidate of master in the stream process, when the stream process of the master in the time information managing portion with the highest degree of priority regarding a candidate of master stops, the time information managing portion is switched into another time information managing portion with the next highest degree of priority regarding a candidate of master. In this case, setting the degree of priority regarding a candidate of master can provide flexibility to arbitrarily select a process, which serves as the master.

In addition, an AV synchronization system according to the present invention comprises a multi-separating portion for separating a multiplexed stream, in which a plurality of streams with instruction information containing whether the master correcting the system clock is or not are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a plurality of time information managing portions acquiring time information from the decoded stream, wherein one of the time information managing portion instructed as the master by the instruction information, serves as the master to correct the system clock, and when the time information managing portion is not instructed as the master, the time information managing portion is switched into another time information managing portion.

Accordingly, it is possible to change a process, which serves as the master, in any time when necessary, irrelevant of whether stop of a stream process of the master occurs or not. Therefore, optimized synchronization can be obtained.

Additionally, an AV synchronization system according to the present invention comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a plurality of time information managing portions acquiring time information from the decoded stream, wherein one of the time information managing portions registered as the master, serves as the master to corrects the system clock based on the time information, and when the stream is in a predetermined state registered previously such as silence, the time information managing portion is switched into another time information managing portion.

According to this construction, condition for changing the master can arbitrarily be specified, therefore, this can provide flexibility.

Moreover, an AV synchronization system according to the present invention comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a plurality of time information managing portions acquiring time information from the decoded stream, wherein one of the time information managing portions registered as the master, serves as the master to corrects the system clock based on the time information, and when reproduction speed varies such that the state changes from normal reproduction to fast forward reproduction, or rewind reproduction, the time information managing portion is switched into another time information managing portion.

According to this construction, it is possible to provide a user-friendly system with normal feeling, primarily based on video. The reason is that sound can be produced at the rate with being adjusted to reproduction condition of video.

In addition, it is preferable that, when the corrected error to the system clock is greater than a predetermined value, the time information managing portion corrects so that the corrected value becomes smaller. In this case, when the corrected error to the system clock is greater than a predetermined value, gradual correction can reduce negative influence on other devices caused by the correction.

Additionally, it is preferable that, when the error between the time information and the time information obtained by to another time information managing portion is greater than a predetermined value, the time information managing portion corrects so that the error gradually reduces. In this case, it is possible to reduce occurrence of problem, such as an image skip, caused by large correction.

It is preferable that, after the time information managing portion is switched into another time information managing portion to serve as the master as a result of the stop of the stream process of the master, when the stream recovers, the former time information managing portion serves as the master again. In this case, since the timing information acquired by the one of the timing information managing portions serves as the master again, suitable condition can be obtained.

It is preferable that, when the stream process of the master stops, the time information managing portion calculates a corrected value for the system clock based on a previous corrected value and continues performing correction for a while. In this case, when the stream recovers within a predetermined time, the process corresponding to the master can remain as the master. Thus, when the stream recovers relatively early, the process corresponding to the master can remain as the master. Accordingly, since correction of clock is performed based on an original process subsequently, this can improve stability of operation.

In addition, it is preferable that, when the stream process of the master stops, in consideration of a previous error for the system clock, when an error is grater than a reference value, the time information managing portion is switched into another time information managing portion to serve as the master, while when the error is less than the reference value, the time information managing portion is not switched to continue the stream processing for a while. In th is case, when a process as a master recovers within predetermined time, the process remains as a master. Even if the stream process corresponding to the master stops, when the stream recovers relatively early, the process corresponding to the master can remain as the master. Accordingly, since an original process continues subsequently, this can improve stability of operation.

It is preferable that, in consideration of an average error of previous corrected values for the system clock of the master, when an error is small, the time information managing portion omits a correction process so as to reduce overhead. In this case, reducing number of correction can reduce overhead in correction.

It is preferable that, when a previous average error of the system clock is small in a stream process other than the master, the time information managing portion omits a reference process so as to reduce overhead. In this case, reducing number of reference can reduce overhead in reference.

In another aspect of the invention, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein the time information managing portion regards the other one of the plurality of streams as a new master when a stream process of a stream regarded as an original master is stops, acquires new time information from the decoded stream regarded as the new master, and corrects the system clock based upon the new time information.

In the present invention, the following constructions for regarding other one of the plurality of streams as a new master can be used.

1). The time information managing portion manages information of the degree of priority regarding a candidate of master for each stream, and regards the other one of the plurality of streams, which has the highest degree of priority except for the stream regarded as the original master, as the new master when the stream process of the stream regarded as the original master stops.

2). When the stream process of the stream regarded as the original master stops, the time information managing portion regards the other one of the plurality of streams, which is able to be acquired time information at the earliest time except for the stream regarded as the master, as a new master.

3). When the stream process of the stream regarded as the master stops, the time information managing portion regards the other one of the plurality of streams, which is able to be acquired time information with the smallest period except for the stream regarded as the original master, as a new master.

4). When the stream process of the stream regarded as the original master stops, the time information managing portion regards the other one of the plurality of streams, which is able to be acquired time information that is able to correct the system clock with the closest period to the time information of the stream regarded as the original master, as a new master.

5). When the stream process of the stream regarded as the original master stops, the time information managing portion regards the other one of the plurality of streams, which is able to the acquired time information whose error to a previous system clock is smallest except for the stream regarded as the original master, as a new master.

6). The multiplexed stream includes information of the degree of priority regarding a candidate of master, and when the stream process of the stream regarded as the original master stops, the time information managing portion regards the other one of the plurality of streams, whose the degree of priority is highest except for the stream regarded as the original master, as a new master.

In addition, it is preferable that, after the time information managing portion regards the other one stream as the new master as a result of the stop of the stream process of the stream regarded as the original master, when the stream process of the stream regarded as the original master recovers, the time information managing portion regards the stream regarded as the original master as the master again.

It is preferable that, when the stream process of the stream regarded as the original master stops, the time information managing portion calculates a corrected value for the system clock based on a previous corrected value and continues performing correction for a predetermined period based on the calculated corrected value.

It is preferable that, when the stream process of the stream regarded as original the master stops, the time information managing portion regards the other one stream as the new master on condition that a previous error for system clock of the master is grater than a reference value, while calculates a corrected value for the system clock based on a previous corrected value and continues performing correction based on the calculated corrected value for a predetermined period on condition that a previous error for system clock of the master is less than a reference value.

In addition, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein the plurality of streams include instruction information containing whether the each of streams itself is or not the master, which varies currently, into each of the streams, and the time information managing portion regards a stream whose the instruction information indicates that the stream itself is the master currently as the master.

Additionally, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein when the stream regarded as an original master is in a predetermined state, the time information managing portion regards the other one of the plurality of streams as a new master.

In this AV synchronization system, the stream regarded as the original master can be audio stream and the predetermined state can be silent state.

Additionally, an AV synchronization system comprises: a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein when the reproduction speed of the multiplexed stream is other than normal reproduction speed, the time information managing portion regards the other one of the plurality of streams as a new master.

Additionally, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein when a corrected error value for the system clock based on the time information is greater than a predetermined value, the time information managing portion corrects the system clock so that the error between the time information of the stream regarded as the master and the system clock gradually reduces.

Additionally, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, correcting the system clock based upon the time information, and correcting an output of a stream other than the stream regarded as the master based upon the system clock; wherein when a corrected error value for the output of the stream other than the stream regarded as the master based on the system clock is greater than a predetermined value, the time information managing portion corrects the output of the stream other than the stream regarded as the master so that the error between the system clock and the output of the stream other than the stream regarded as the master gradually reduces.

Additionally, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, and correcting the system clock based upon the time information; wherein when an average value of previous corrected errors for the system clock based on the time information is less than a predetermined value, the time information managing portion omits the correction.

Moreover, an AV synchronization system comprises a multi-separating portion for separating a multiplexed stream, in which a plurality of streams are multiplexed, into each of the streams; a plurality of buffers for temporarily storing each of the separated streams respectively; a plurality of decoding portions for decoding the stream stored in each of the buffers respectively; a data providing portion for providing the decoded data from the decoding portion with synchronized with a system clock; and a time information managing portion for regarding one of the plurality of streams as a master, acquiring time information from the decoded stream regarded as a master, correcting the system clock based upon the time information, and correcting an output of a stream other than the stream regarded as the master based upon the system clock; wherein when an average value of previous corrected errors for the output of the stream other than the stream regarded as the master based on the system clock is less than a predetermined value, the time information managing portion omits the correction for the output of the stream other than the stream regarded as the master.

As mentioned above, according to the present invention, when the stream process corresponding to the master stops, the timing information, which is acquired from other decoded stream, serves as the master, thus, it is possible to maintain proper synchronization between a plurality of streams. Further, in the case that an error of clock is large, gradual correction can reduce a sharp image skip, sound skip, and so on. Furthermore, in the case that an error of clock is small, omission of correction or reference can provide a system with less overhead.

BRIEF DESCRIPTION OF THE DRAWINGS

Other objects of the present invention will become apparent from the following detailed description and the appended claims. Furthermore, other advantages of the present invention will become apparent to those skilled in the art from the following detailed description.

FIG. 2 is a timing chart showing operation in the case that audio data stops in the audio master in a concrete embodiment of the present invention;

FIG. 6 is a timing chart showing a processing flow performed by processing, in which a device with the smallest error between a system clock and a previous system clock taken from a stream, when the stream process corresponding to the master stops, in a concrete embodiment;

FIG. 7 is a timing chart showing a processing flow in the case that a stream, which includes information containing the degree of priority as a candidate of the master, is transmitted in a concrete embodiment of the present invention;

FIG. 12 is a timing chart showing a processing flow, in which, when an error to PTS is greater than a predetermined value with reference to a clock in a processes other than the master, the error is gradually reduced, in order to prevent a large image skip of other processing and so on, caused by sharp output correction, in a concrete embodiment;

FIG. 16 is a timing chart showing a processing flow, in which correction is omitted when an average error of corrected values in several times of previous correction, so as to reduce overhead, in the case that correction is performed based on a process as the master, in a concrete embodiment;

FIG. 18 is a chart showing synchronization processing in the case that a stream containing audio, video, text and a still-image is reproduced based on the audio master, in a conventional art;

DETAILED DESCRIPTION OF THE INVENTION

The following description will describe preferred concrete embodiments according to the present invention with reference to the drawings.

Figure 1:
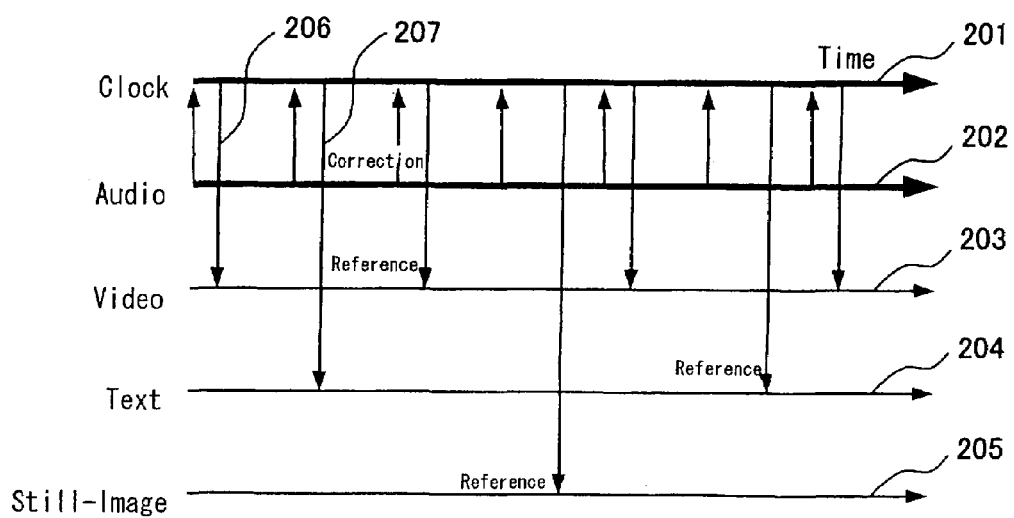
FIG. 1 is a block diagram showing a construction of an AV synchronization system according to a concrete embodiment of the present invention.
Figure 19:
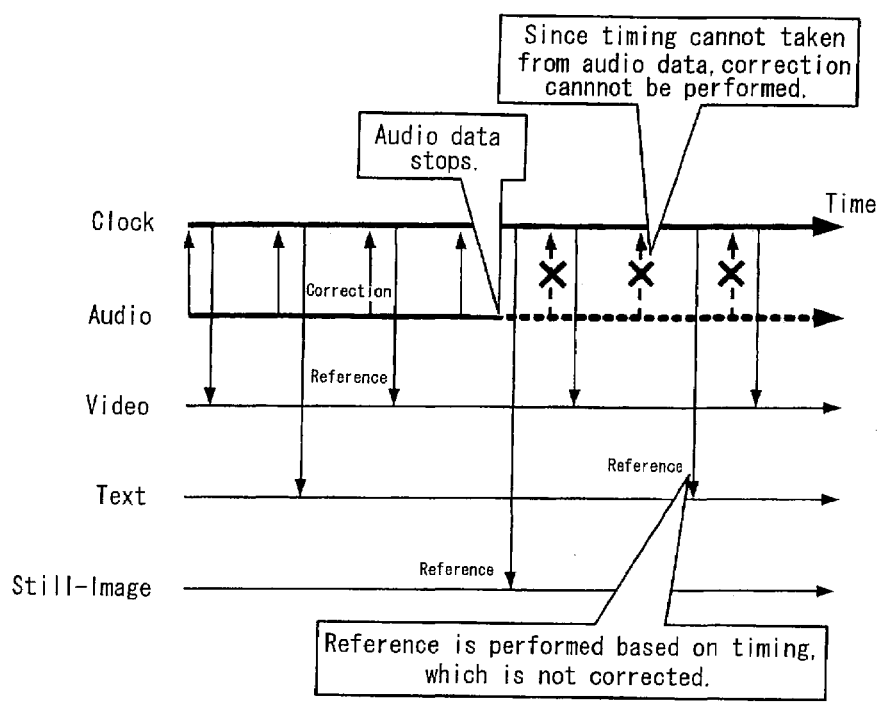
FIG. 19 is a timing chart showing operation in the case that audio data stops in the audio master in a conventional art.

FIG. 1 shows a construction of an AV synchronization system according to a preferred embodiment 1 of the present invention. This AV synchronization system handles with a stream, which audio and video are multiplexed thereto.

In the AV synchronization system of this concrete example, a stream input portion 101 receives a stream and a multiplex separation portion 102 separates it into an audio stream and a video stream. The audio stream is supplied to an audio buffer 103 and the video stream is supplied to a video buffer 108. An audio decoding portion 104 decodes the audio stream. An audio time information management portion 105 takes time information PTS (Presentation Time Stamps) from the decoded stream, and corrects a system clock based on its timing in the case of the audio master. The processed data is sent to an audio providing portion 106, and is produced as sound. A video decoding portion 109 decodes the video stream. A video time information management portion 110 takes time information PTS from the decoded video stream, and compared with the system clock. A video providing portion 111 provides it in the same timing.

FIG. 2 is a timing chart showing operation in the case that audio data stops in the audio master. Thick lines represent the clock process, and the audio process as the master. An upward arrow directing toward the clock represents correction of clock. A downward arrow drawn from the clock represents reference of clock. A dotted line represents a stop of audio data. When the audio data stops, a video process serves as the master. Accordingly, the timing information PTS can be taken from the stream in a video process. Thus, the clock can be corrected subsequently, and it is possible to maintain synchronization in the video master.

In this example, the degree of priority is previously registered by a function "Master_regist". Audio is registered as the highest degree of priority, and video is registered as the second highest degree of priority. Accordingly, first, audio serves as the master, and video serves as the master when the audio stream stops.

Figure 3:
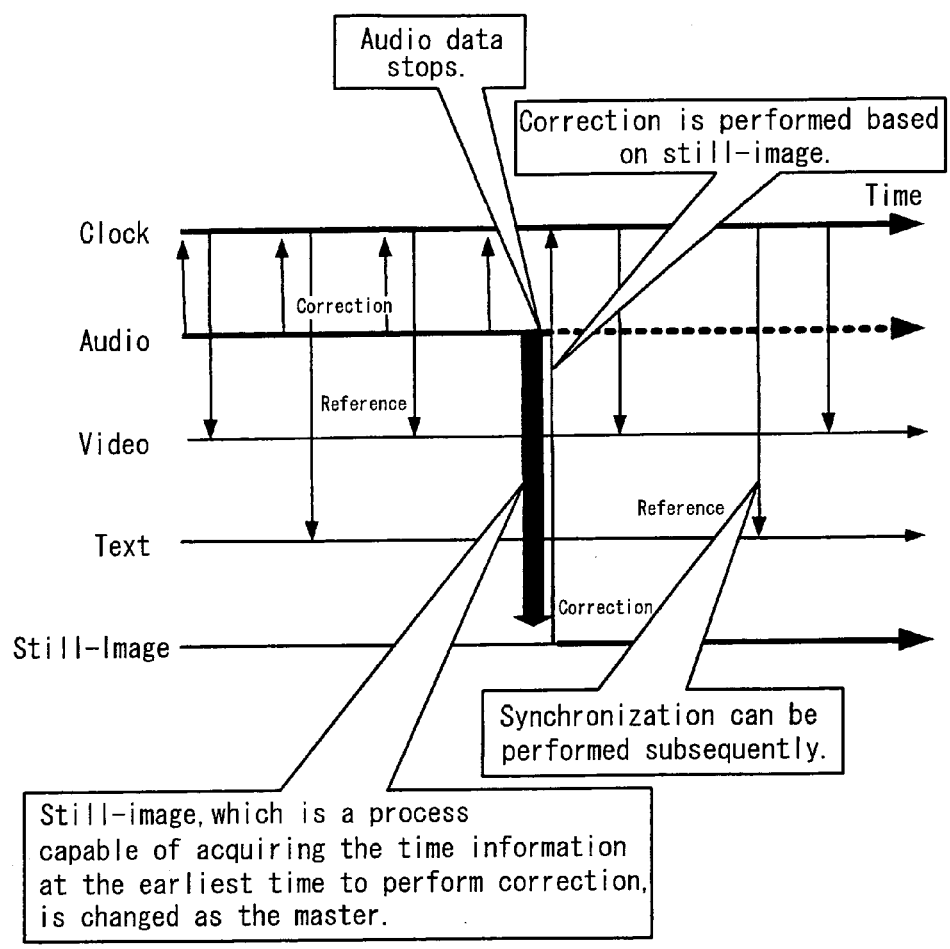
FIG. 3 is a timing chart showing a processing flow performed by a method, in which a process capable of correction at the next earliest time is changed as the master, when a stream process corresponding to the master stops, in a concrete embodiment.

FIG. 3 is a timing chart showing a processing flow performed by a method, in which a process capable of correction at the next earliest time is changed as the master, when a stream process corresponding to the master stops.

In an illustrated example, when the audio stream stops, a still-image process can acquire the timing information PTS at the earliest time. Accordingly, since the still-image process serves as the master, the clock can be corrected quickly, thus, it is possible to maintain synchronization.

Figure 4:
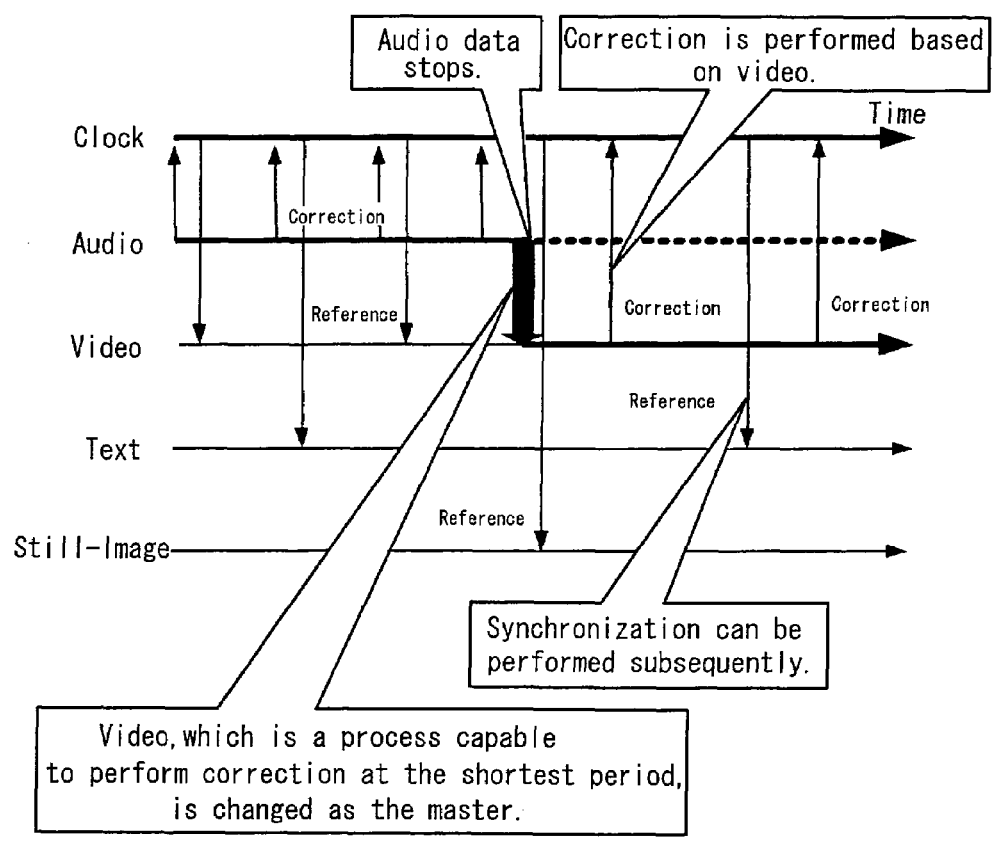
FIG. 4 is a timing chart showing a processing flow performed by processing, in which a process with the smallest period is changed as the master, when the stream process corresponding to the master stops, in a concrete embodiment.

FIG. 4 is a timing chart showing a processing flow performed by processing, in which a process with the smallest period is changed as the master, when the stream process corresponding to the master stops.

In an illustrated example, the video process has the smallest period. Accordingly, a video process serves as the master. Subsequently, the clock can be minutely corrected based on the video process, and it is possible to maintain synchronization.

Figure 5:
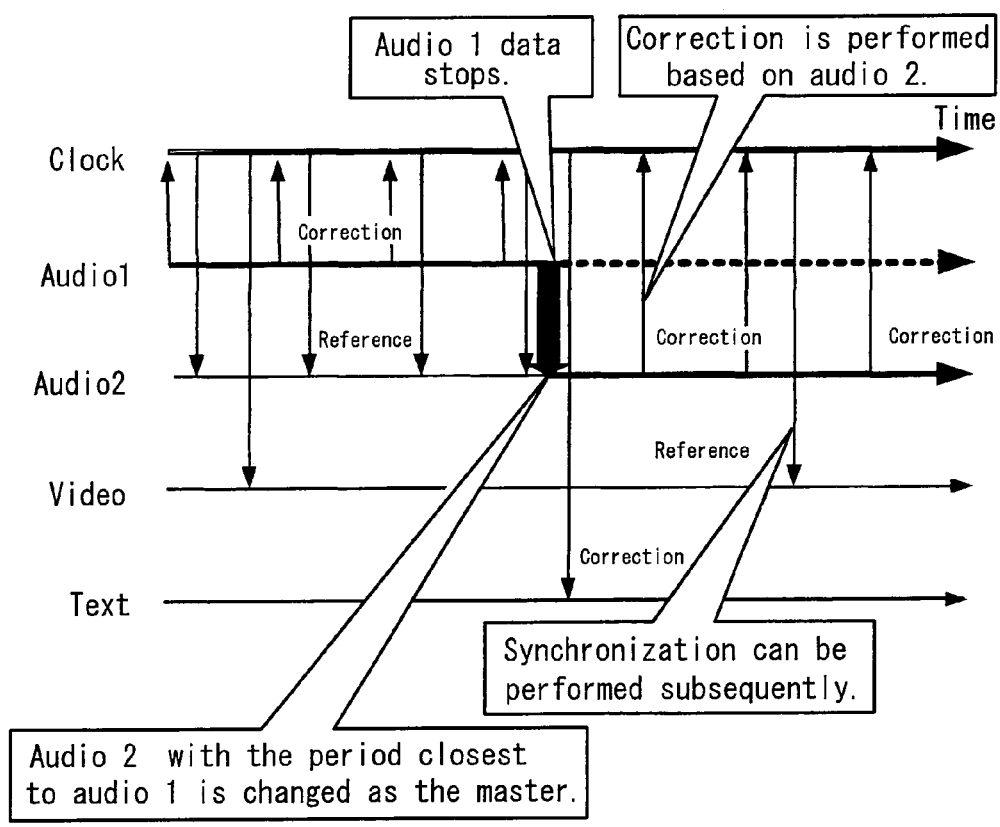
FIG. 5 is a timing chart showing a processing flow performed by a method, in which a process with the period corrected for the system clock closest to a process, which currently serves as the master, is changed as the master, when the stream process corresponding to the master stops, in a concrete embodiment.

FIG. 5 is a timing chart showing a processing flow performed by a method, in which a process with the period corrected for the system clock closest to a process, which currently serves as the master, is changed as the master, when the stream process corresponding to the master stops.

In the case of a two-channel broadcast such as a bilingual broadcast currently transmitted, retrieving other channel with the same period can cause audio 2 to serve as the master. Accordingly, the audio 2 serves as the master, it is possible to reproduce without a feeling that something wrong.

FIG. 6 is a timing chart showing a processing flow performed by processing, in which a device with the smallest error between a system clock and a previous system clock taken from a stream, when the stream process corresponding to the master stops. Accordingly, the clock can be corrected based on a text process, and it is possible to maintain synchronization.

In an illustrated example, the text process has the smallest previous error, and thus serves as the master.

FIG. 7 is a timing chart showing a processing flow in the case that a stream, which includes information containing the degree of priority as a candidate of the master, is transmitted. This can allow to change the degree of priority to perform according to the contents of a stream.

In an illustrated example, spare bits of a stream contain the priority of master, which represents first and second as the audio processes, third as the video process, and fourth priority as the text process. Thus, the audio 2 process as second priority serves as the master, when the audio 1 process as the first priority stops.

The following description will describe a method for switching a process, which serves as the master, irrelevant to a data stop in the process as a mater.

Figure 8:
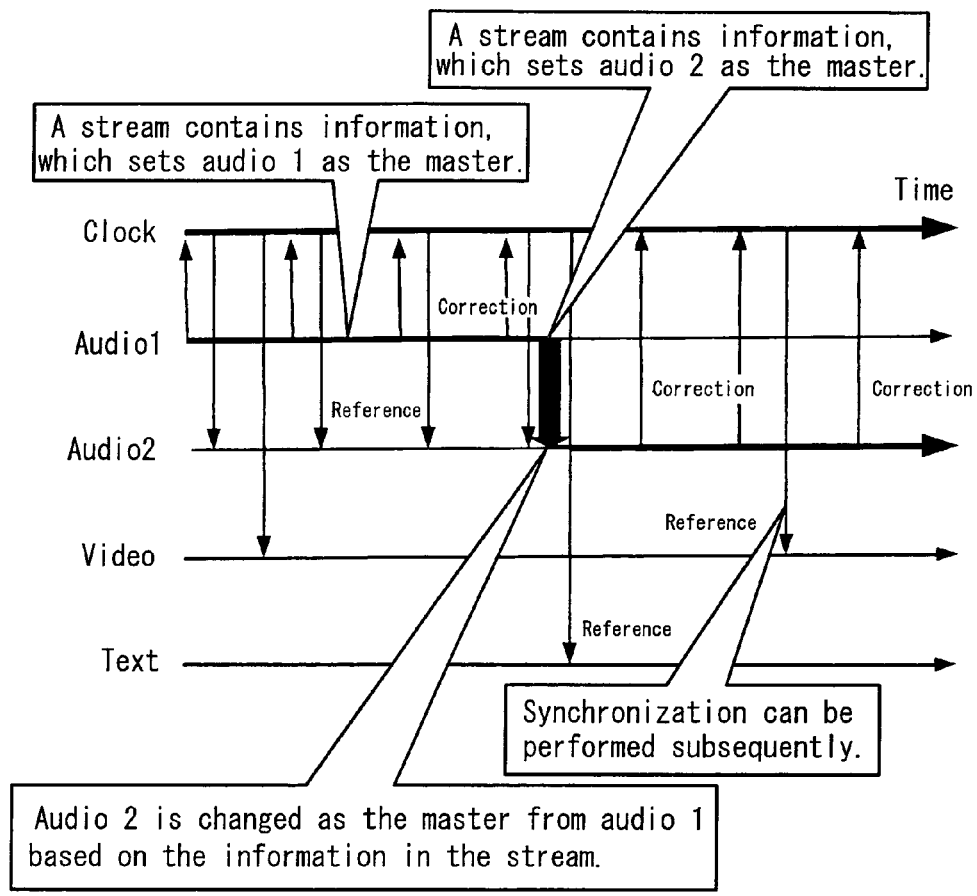
FIG. 8 is a timing chart showing a processing flow in the case that a stream, which includes information regarding a process to currently serve as the master, is transmitted, in a concrete embodiment of the present invention.

FIG. 8 is a timing chart showing a processing flow in the case that a stream, which includes information regarding a process to currently serve as the master, is transmitted.

Spare bits of a stream containing information of a current master are transmitted. In an illustrated example, the stream including information as audio 1 master is transmitted. Then, a process, which serves as the master, is changed from the audio 1 process to the audio 2 process by transmitting the steam including information as audio 2 master. The change is irrelevant to a stop of audio 1 master.

Figure 9:
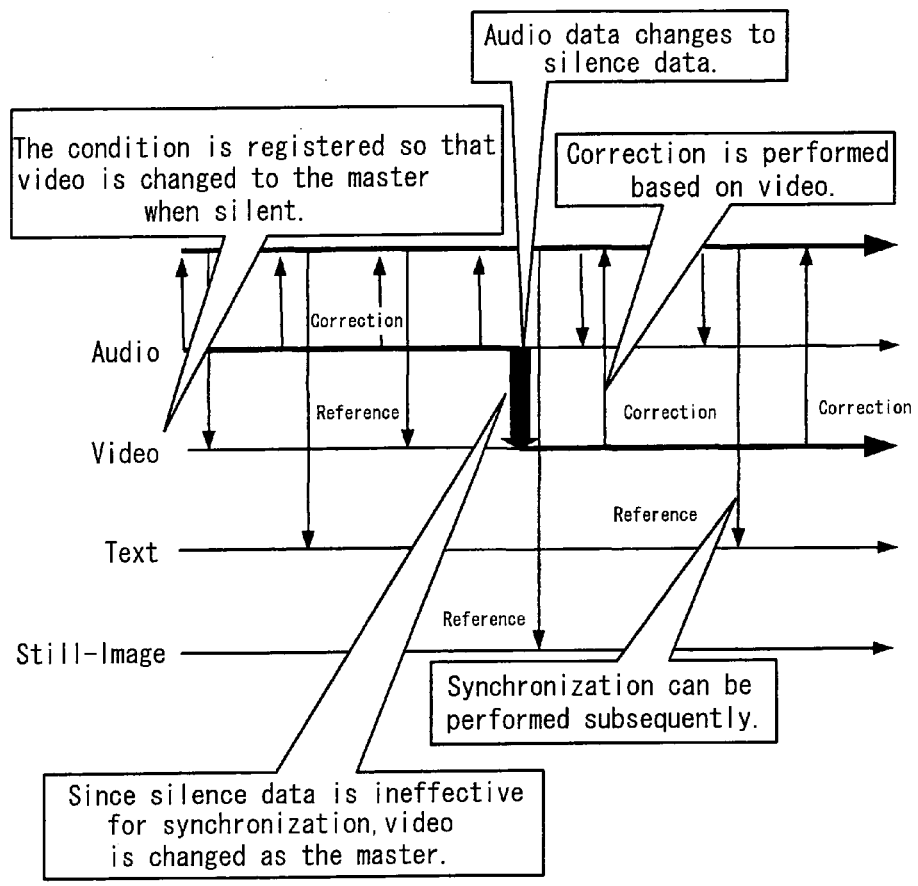
FIG. 9 is a timing chart showing a processing flow performed by processing, in which, when a process as the master falls within a predetermined condition, other process serves as the master, in a concrete embodiment.

FIG. 9 is a timing chart showing a processing flow performed by processing, in which, when a process as the master falls within a predetermined condition, other process serves as the master.

In an illustrated example, silence in audio is registered as the condition. When the audio becomes silence, a video process automatically changes as the master. It is preferable that all video is reproduced and then the silent audio is adjusted rather than that all audio is produced and then the video is adjusted. The reason is that this can provide a user-friendly system with normal feeling. The change is irrelevant to a stop of audio master.

Figure 10:
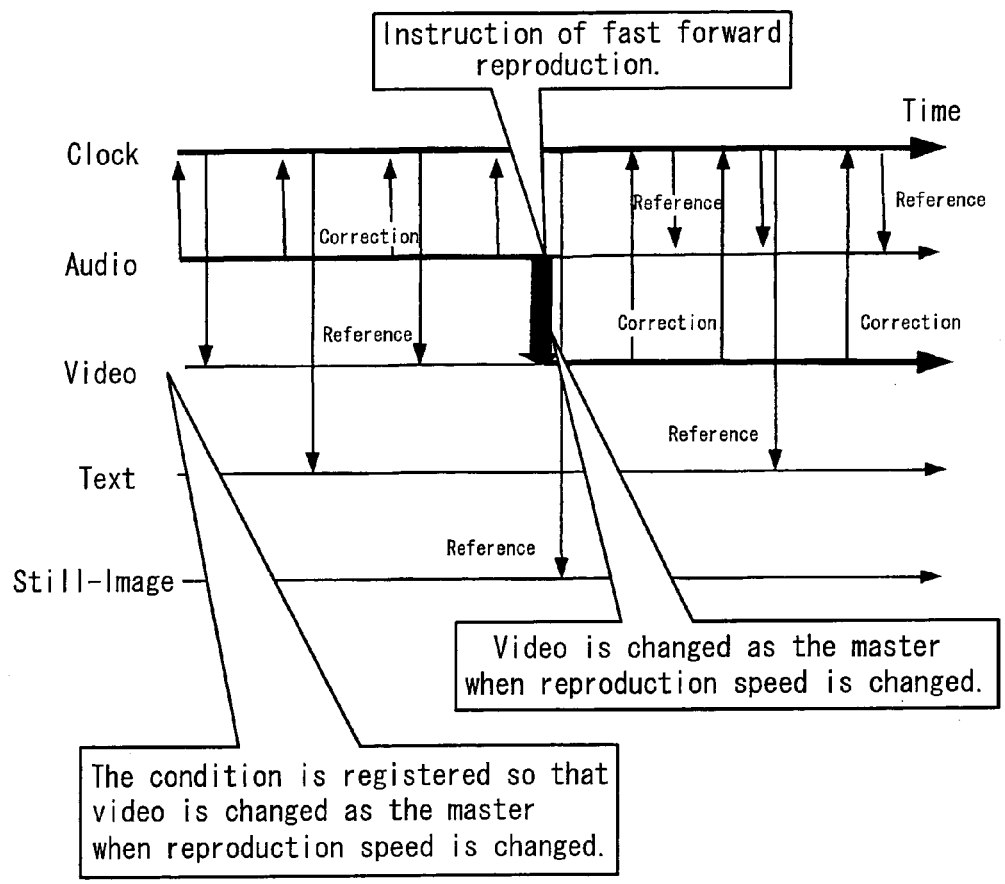
FIG. 10 is a timing chart showing a processing flow performed by processing, in which, when reproduction speed varies caused by instruction of fast forward reproduction, or the like, other device serves as the master, in a concrete embodiment of the present invention.

FIG. 10 is a timing chart showing a processing flow performed by processing, in which, when reproduction speed varies caused by instruction of fast forward reproduction, or the like, other device serves as the master.

Variation of reproduction speed is previously registered so that a video process changes as master. This can allow for the video process to serve as the master automatically when fast forward reproduction. Thus, video can be reproduced on a priority basis, whereby the video can be constantly displayed when fast forward reproduction. Accordingly, it is possible to achieve when fast forward reproduction with normal feeling. The change is irrelevant to a stop of audio master.

The following description will describe a method for correcting a clock.

Figure 11:
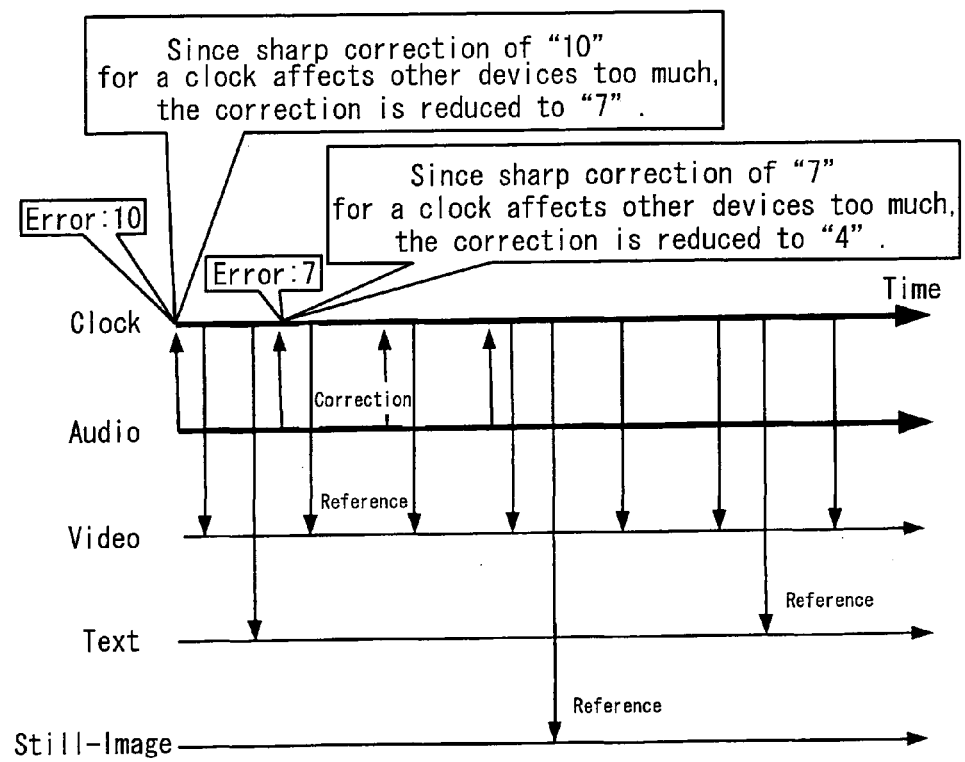
FIG. 11 is a timing chart showing a processing flow, in which an error regarding a corrected value is gradually reduced when the error is greater than a predetermined value, in the case that a clock is corrected based on the master, in order to prevent a large image skip of other processing and so on, caused by sharp correction, in a concrete embodiment.

FIG. 11 is a timing chart showing a processing flow, in which an error regarding a corrected value is gradually reduced when the error is greater than a predetermined value, in the case that a clock is corrected based on the master, in order to prevent a large image skip of other processing and so on, caused by sharp correction.

When a corrected error is greater than a certain value, the correction is revised within a certain rate of the error (in this case, 70%). This can reduce influence on other device caused by the correction.

FIG. 12 is a timing chart showing a processing flow, in which, when an error to PTS is greater than a predetermined value with reference to a clock in a processes other than the master, the error is gradually reduced, in order to prevent a large image skip of other processing and so on, caused by sharp output correction.

When a corrected error is greater than a certain value, image with a certain rate (in this case, 70%) of the timing information PTS is output. This can reduce an image skip.

The following description will describe the case that a process as the master recovers from its stop.

Figure 13:
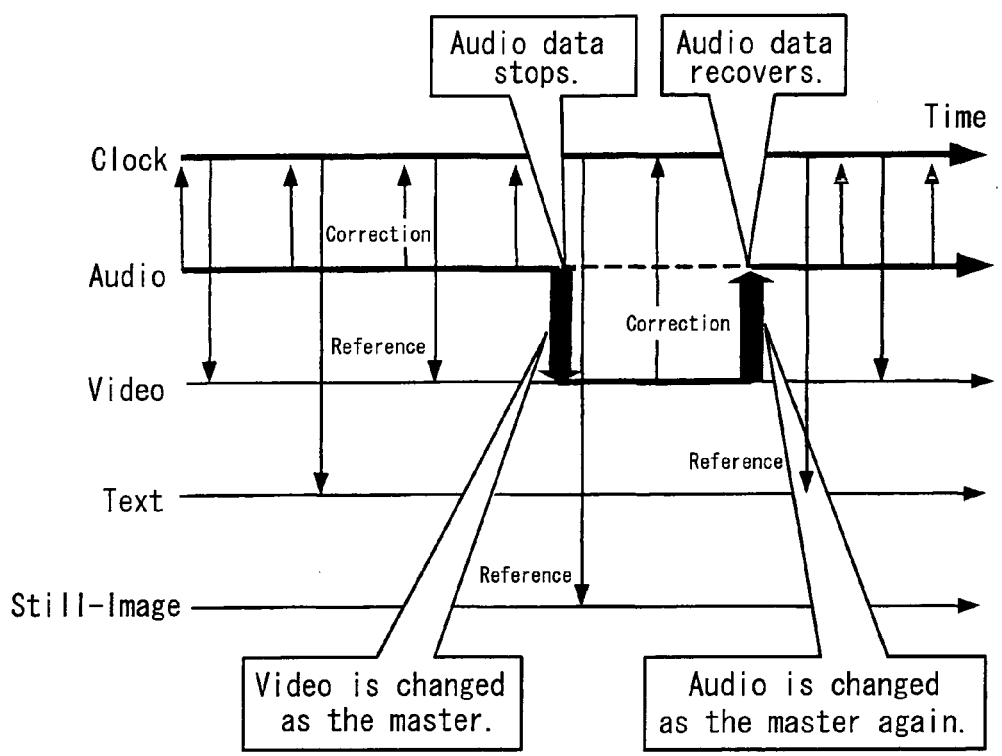
FIG. 13 is a timing chart showing a processing flow in which a process corresponding to the original master serves as the master again when the process corresponding to the original master is performed again, after other processing serves as the master in the case that the process corresponding to the original master stops, in a concrete embodiment.

FIG. 13 is a timing chart showing a processing flow in which a process corresponding to the original master serves as the master again when the process corresponding to the original master is performed again, after other processing serves as the master in the case that the process corresponding to the original master stops.

In an illustrated example, in the case that an audio stream stops during operation of an audio process as the master, a video process serves as the master. While, the audio process serves as the master again after the audio stream recovers.

Figure 14:
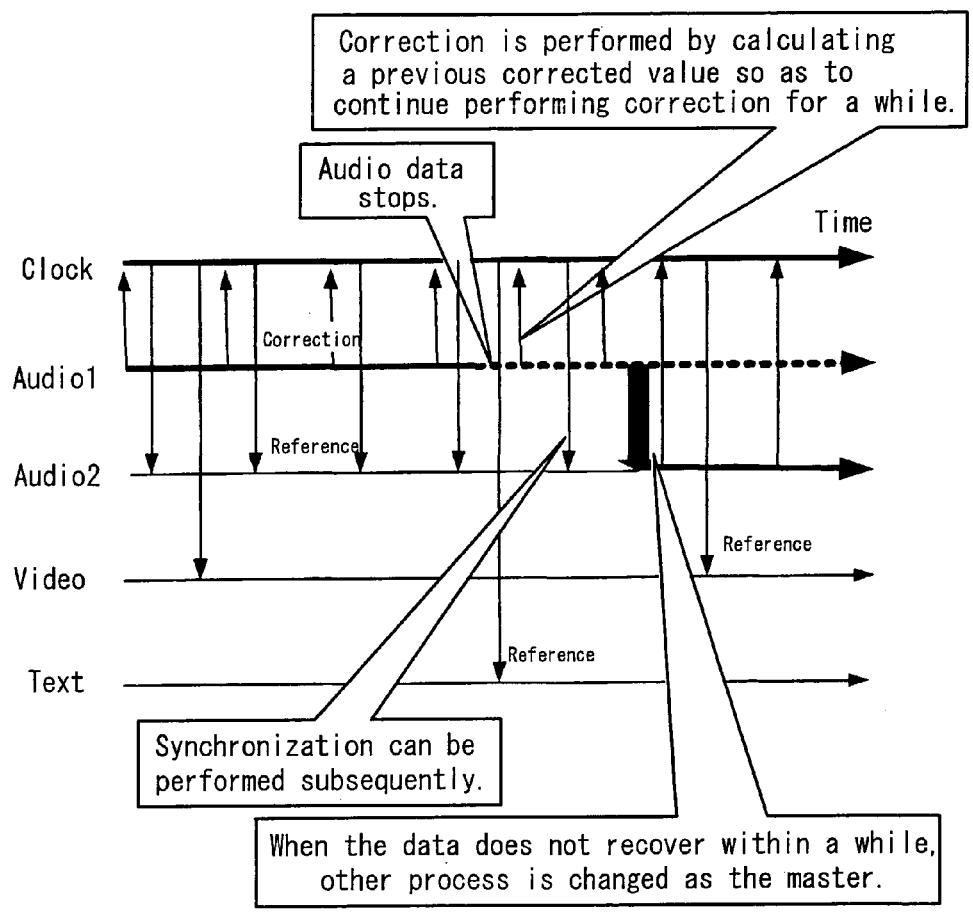
FIG. 14 is a timing chart showing a processing flow, in which correction is continued based on a process as the master by calculating based on a previous corrected value for a while when a process corresponding to the master stops, and other processing serves as the master when the process corresponding to the master does not recover, in a concrete embodiment.

FIG. 14 is a timing chart showing a processing flow, in which correction is continued based on a process as the master by calculating based on a previous corrected value for a while when a process corresponding to the master stops, and other processing serves as the master when the process corresponding to the master does not recover.

In an illustrated example, after a stream stops in the audio 1 process, corrected values corresponding to two times is calculated, and then the correction is performed. However, a process as the master does not recover, thus, the audio 2 process serves as the master. When a process as the master recovers within predetermined time, the process remains as the master.

Figure 15:
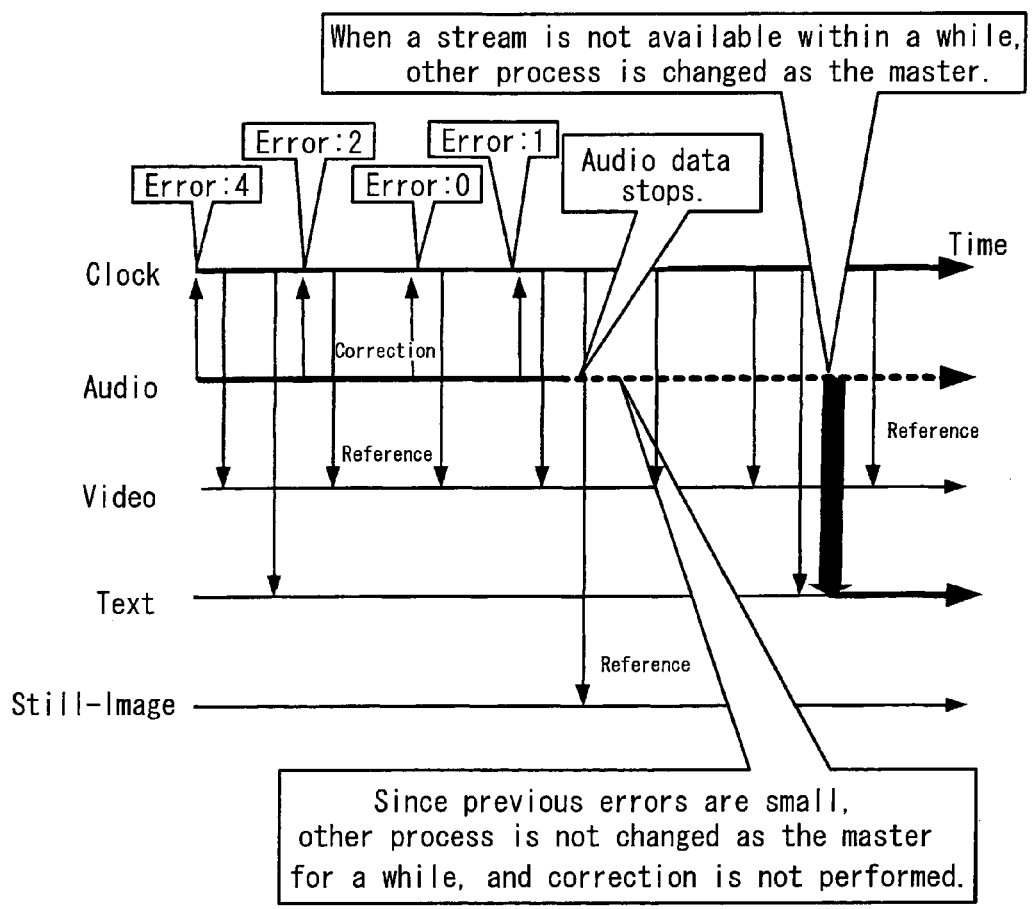
FIG. 15 is a timing chart showing a processing flow, in which, when a stream process corresponding to the master stops, in consideration of a previous error of corrected value, when the previous error of corrected value is grater than a reference value, other process is changed as the master, while when the error is less than the reference value, the stream process corresponding to the master remain as the master without correction for a while, in a concrete embodiment.

FIG. 15 is a timing chart showing a processing flow, in which, when a stream process corresponding to the master stops, in consideration of a previous error of corrected value, when the previous error of corrected value is grater than a reference value, other process is changed as the master, while when the error is less than the reference value, the stream process corresponding to the master remain as the master without correction for a while.

In an illustrated example, a threshold value is set as "10" to determine that an error of a previous corrected value is large. In this example, the value is smaller than the threshold value, thus, a process as the master remains as the master and keep processing for a while. However, the stream for the process as the master does not recover for a while, thus, other process serves as the master. When a process as the master recovers within predetermined time, the process remains as the master.

FIG. 16 is a timing chart showing a processing flow, in which correction is omitted when an average error of corrected values in several times of previous correction, so as to reduce overhead, in the case that correction is performed based on a process as the master. Dotted-line upward arrows represent omission of the correction.

In an illustrated example, the correction is omitted when an average error in previous two times is not more than 3. This can reduce overhead.

Figure 17:
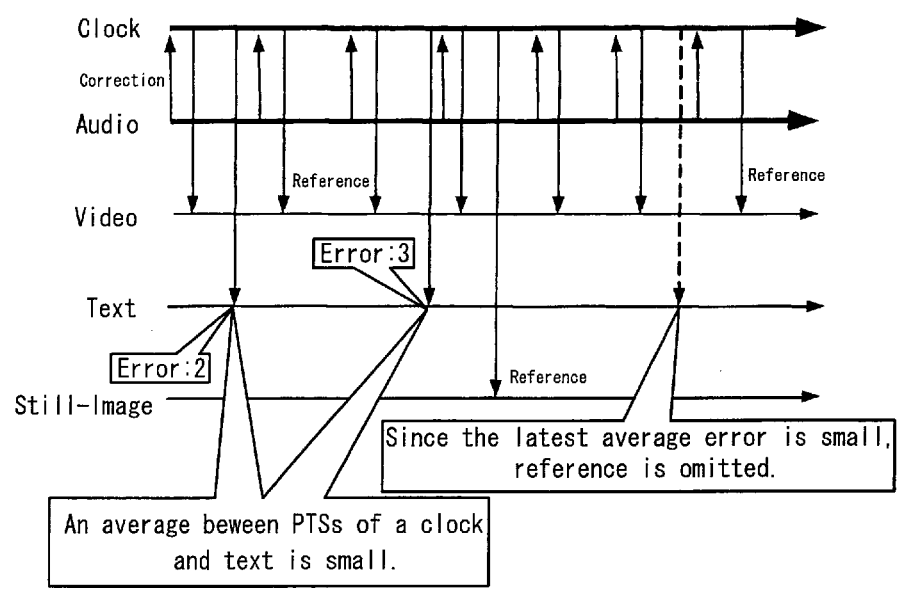
FIG. 17 is a timing chart showing a processing flow, in which reference is omitted when an error between reference values in the latest several times and PTS of a stream is small, in the case that each device other than the master references a clock, in a concrete embodiment.

FIG. 17 is a timing chart showing a processing flow, in which reference is omitted when an error between reference values in the latest several times and PTS of a stream is small, in the case that each device other than the master references a clock. Dotted-line downward arrows represent omission of the reference.

In an illustrated example, an average of errors between the reference values and PTS in first time, and second time is small. Accordingly, next reference is omitted, and the text process provides the text with the same timing information PTS based on calculation of a clock value. This can reduce overhead of reference.

An AV synchronization system according to the present invention digital-decompresses a plurality of streams such as an audio stream, a video stream, and corrects a system clock by a stream process as the master. The AV synchronization system can preferably maintain synchronization even when a stream corresponding to a process as the master stops or completed in the case of reproduction, in which streams are synchronized with each other. In addition, it is advantageous to prevent an image skip, a sound skip, and so on, and to reduce overhead of correction and reference.

The present invention is described with concrete embodiments above. However, the conjunction or arrangement of the components according to the embodiments of the present invention may be embodied in other specific forms without departing from the spirit or the appended claims.

What is claimed is:

1. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a plurality of time information managing portions for acquiring time information from the decoded stream, correcting the system clock based upon the time information when a master correcting the system clock is registered, and switching one time information managing portion in charge of the stream process of the master into another time information managing portion when a stream process of the master stops.

2. The AV synchronization system according to claim 1, wherein the master registered in the time information managing portion includes the degree of priority, and when the stream process in the time information managing portion with the highest degree of priority stops, the time information managing portion is switched into another time information managing portion with the next highest degree of priority.

3. The AV synchronization system according to claim 1, wherein when the stream process of the master in the time information managing portion stops, the time information managing portion is switched into another time information managing portion acquiring the time information from the stream at the earliest time.

4. The AV synchronization system according to claim 1, wherein when the stream process of the master in the time information managing portion stops, the time information managing portion is switched into another time information managing portion acquiring the time information with the smallest period from the stream.

5. The AV synchronization system according to claim 1, wherein when the stream process of the master in the time information managing portion stops, the time information managing portion is switched into another time information managing portion with the period corrected for the system clock closest to the time information managing portion.

6. The AV synchronization system according to claim 1, wherein when the stream process of the master in the time information managing portion stops, the time information managing portion is switched into another time information managing portion with the smallest error to a previous system clock.

7. The AV synchronization system according to claim 1, wherein the multiplexed stream includes information of the degree of priority regarding a candidate of master in the stream process, when the stream process of the master in the time information managing portion with the highest degree of priority regarding a candidate of master stops, the time information managing portion is switched into another time information managing portion with the next highest degree of priority regarding a candidate of master.

8. The AV synchronization system according to claim 1, wherein when a corrected error to the system clock is greater than a predetermined value, the time information managing portion corrects so that the corrected value becomes smaller.

9. The AV synchronization system according to claim 1, wherein when an error between the time information and the time information obtained by to another time information managing portion is greater than a predetermined value, the time information managing portion corrects so that the error gradually reduces.

10. The AV synchronization system according to claim 1, wherein after the time information managing portion is switched into another time information managing portion to serve as the master as a result of the stop of the stream process of the master, when the stream recovers, the former time information managing portion serves as the master again.

11. The AV synchronization system according to claim 1, wherein when the stream process of the master stops, the time information managing portion calculates a corrected value for the system clock based on a previous corrected value and continues performing correction for a while.

12. The AV synchronization system according to claim 1, wherein when the stream process of the master stops, in consideration of a previous error for the system clock, when an error is grater than a reference value, the time information managing portion is switched into another time information managing portion to serve as the master, while when the error is less than the reference value, the time information managing portion is not switched to continue the stream processing for a while.

13. The AV synchronization system according to claim 1, wherein in consideration of an average error of previous corrected values for the system clock of the master, when an error is small, the time information managing portion omits a correction process so as to reduce overhead.

14. The AV synchronization system according to claim 1, wherein when a previous average error of the system clock is small in a stream process other than the master, the time information managing portion omits a reference process so as to reduce overhead.

15. An AV synchronization system comprising:
a multi-separating portion for separating a multiplexed stream, in which a plurality of streams with instruction information containing whether the master correcting the system clock is or not are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a plurality of time information managing portions acquiring time information from the decoded stream,
wherein one of the time information managing portion instructed as the master by the instruction information, serves as the master to correct the system clock, and when the time information managing portion is not instructed as the master, the time information managing portion is switched into another time information managing portion.

16. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a plurality of time information managing portions acquiring time information from the decoded stream,
wherein one of the time information managing portions registered as the master, serves as the master to corrects the system clock based on the time information, and when the stream is in a silence state registered previously, the time information managing portion is switched into another time information managing portion.

17. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a plurality of time information managing portions acquiring time information from the decoded stream,
wherein one of the time information managing portions registered as the master, serves as the master to corrects the system clock based on the time information, and when reproduction speed varies such that the state changes from normal reproduction to fast forward reproduction, or rewind reproduction, the time information managing portion is switched into another time information managing portion.

18. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein the time information managing portion regards the other one of the plurality of streams as a new master when a stream process of a stream regarded as an original master is stops, acquires new time information from the decoded stream regarded as the new master, and corrects the system clock based upon the new time information.

19. The AV synchronization system according to claim 18, wherein the time information managing portion manages information of the degree of priority regarding a candidate of master for each stream, and regards the other one of the plurality of streams, which has the highest degree of priority except for the stream regarded as the original master, as the new master when the stream process of the stream regarded as the original master stops.

20. The AV synchronization system according to claim 18, wherein when the stream process of the stream regarded as the original master stops, the time information managing portion regards the other one of the plurality of streams, which is able to be acquired time information at the earliest time except for the stream regarded as the master, as a new master.

21. The AV synchronization system according to claim 18, wherein when the stream process of the stream regarded as the master stops, the time information managing portion regards the other one of the plurality of streams, which is able to be acquired time information with the smallest period except for the stream regarded as the original master, as a new master.

22. The AV synchronization system according to claim 18. wherein when the stream process of the stream regarded as the original master stops, the time information managing portion regards the other one of the plurality of streams, which is able to be acquired time information that is able to correct the system clock with the closest period to the time information of the stream regarded as the original master, as a new master.

23. The AV synchronization system according to claim 18, wherein when the stream process of the stream regarded as the original master stops, the time information managing portion regards the other one of the plurality of streams, which is able to the acquired time information whose error to a previous system clock is smallest except for the stream regarded as the original master, as a new master.

24. The AV synchronization system according to claim 18, wherein the multiplexed stream includes information of the degree of priority regarding a candidate of master, and when the stream process of the stream regarded as the original master stops, the time information managing portion regards the other one of the plurality of streams, whose the degree of priority is highest except for the stream regarded as the original master, as a new master.

25. The AV synchronization system according to claim 18, wherein after the time information managing portion regards the other one stream as the new master as a result of the stop of the stream process of the stream regarded as the original master, when the stream process of the stream regarded as the original master recovers, the time information managing portion regards the stream regarded as the original master as the master again.

26. The AV synchronization system according to claim 18, wherein the stream process of the stream regarded as the original master stops, the time information managing portion calculates a corrected value for the system clock based on a previous corrected value and continues performing correction for a predetermined period based on the calculated corrected value.

27. The AV synchronization system according to claim 18, wherein when the stream process of the stream regarded as original the master stops, the time information managing portion regards the other one stream as the new master on condition that a previous error for system clock of the master is grater than a reference value, while calculates a corrected value for the system clock based on a previous corrected value and continues performing correction based on the calculated corrected value for a predetermined period on condition that a previous error for system clock of the master is less than a reference value.

28. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein the plurality of streams include instruction information containing whether the each of streams itself is or not the master, which varies currently, into each of the streams, and the time information managing portion regards a stream whose the instruction information indicates that the stream itself is the master currently as the master.

29. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein when the stream regarded as an original master is in a predetermined state, the time information managing portion regards the other one of the plurality of streams as a new master.

30. The AV synchronization system according to claim 29, wherein the stream regarded as the original master is audio stream and the predetermined state is silent state.

31. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein when the reproduction speed of the multiplexed stream is other than normal reproduction speed, the time information managing portion regards the other one of the plurality of streams as a new master.

32. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein when a corrected error value for the system clock based on the time information is greater than a predetermined value, the time information managing portion corrects the system clock so that the error between the time information of the stream regarded as the master and the system clock gradually reduces.

33. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, correcting the system clock based upon the time information, and correcting an output of a stream other than the stream regarded as the master based upon the system clock;
wherein when a corrected error value for the output of the stream other than the stream regarded as the master based on the system clock is greater than a predetermined value, the time information managing portion corrects the output of the stream other than the stream regarded as the master so that the error between the system clock and the output of the stream other than the stream regarded as the master gradually reduces.

34. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, and correcting the system clock based upon the time information;
wherein when an average value of previous corrected errors for the system clock based on the time information is less than a predetermined value, the time information managing portion omits the correction.

35. An AV synchronization system comprising:
a multi-separating portion for separating a multiplexed stream, in which a plurality of streams are multiplexed, into each of the streams;
a plurality of buffers for temporarily storing each of the separated streams respectively;
a plurality of decoding portions for decoding the stream stored in each of the buffers respectively;
a data providing portion for providing the decoded data from the decoding portion with synchronized with a system clock; and
a time information managing portion for regarding one of the plurality of streams as a master, acquiring time information from the decoded stream regarded as a master, correcting the system clock based upon the time information, and correcting an output of a stream other than the stream regarded as the master based upon the system clock;
wherein when an average value of previous corrected errors for the output of the stream other than the stream regarded as the master based on the system clock is less than a predetermined value, the time information managing portion omits the correction for the output of the stream other than the stream regarded as the master.

* * * * *